United States Patent
Züercher et al.

(10) Patent No.: US 9,637,656 B2
(45) Date of Patent: May 2, 2017

(54) LOW DENSITY ETHYLENE-BASED POLYMER COMPOSITIONS WITH GOOD MELT STRENGTH AND HIGH DENSITY

(71) Applicant: Dow Global Technologies LLC, Midland, MI (US)

(72) Inventors: Karl Züercher, Samstagern (CH); Cornelis F. J. den Doelder, Terneuzen (NL); Marc A. Mangnus, Clinge (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/787,434

(22) PCT Filed: Apr. 30, 2014

(86) PCT No.: PCT/US2014/036183
§ 371 (c)(1),
(2) Date: Oct. 27, 2015

(87) PCT Pub. No.: WO2014/179469
PCT Pub. Date: Nov. 6, 2014

(65) Prior Publication Data
US 2016/0068700 A1    Mar. 10, 2016

Related U.S. Application Data

(60) Provisional application No. 61/818,234, filed on May 1, 2013.

(51) Int. Cl.
C08L 23/06 (2006.01)
C09D 123/06 (2006.01)
D01F 6/04 (2006.01)

(52) U.S. Cl.
CPC ............ *C09D 123/06* (2013.01); *C08L 23/06* (2013.01); *D01F 6/04* (2013.01); *C08L 2203/16* (2013.01); *C08L 2205/025* (2013.01)

(58) Field of Classification Search
CPC ... C09D 123/06; C08L 23/06; C08L 2203/16; C08L 2205/025; D01F 6/04
See application file for complete search history.

(56) References Cited

U.S. PATENT DOCUMENTS

| | | |
|---|---|---|
| 2004/0062942 A1 | 4/2004 | Lustiger et al. |
| 2007/0225445 A1 | 9/2007 | Nguyen et al. |
| 2012/0028017 A1* | 2/2012 | Saraf et al. ............ B32B 27/32 428/218 |

FOREIGN PATENT DOCUMENTS

| | | |
|---|---|---|
| EP | 2123707 B1 | 10/2010 |
| WO | 2005/023912 A2 | 3/2005 |
| WO | 2011/075465 A1 | 6/2011 |
| WO | 2013/078018 A2 | 5/2013 |

OTHER PUBLICATIONS

PCT/US2014/036183, International Search Report and Written Opinion dated Nov. 13, 2014.
PCT/US2014/036183, International Preliminary Report on Patentability dated Nov. 12, 2015.

* cited by examiner

*Primary Examiner* — Nathan M Nutter

(57) ABSTRACT

The invention provides a composition comprising a first ethylene-based polymer, formed by a high pressure, free-radical polymerization process comprising at least one autoclave reactor, and a second ethylene-based polymer, formed by a high pressure, free-radical polymerization process comprising at least one autoclave reactor, such composition comprising the following properties: A) a melt index (I2) from 2.5 to 10 g/10 min; B) a density from 0.920 to 0.935 g/cc; and wherein the second polymer is present in an amount from 5 to 95 weight percent, based on the sum of the weight of the first polymer and the second polymer; and wherein the density of the of the second polymer is greater than the density of the first polymer, and wherein the first polymer has a melt index I2 greater than 2.5 g/10 min.

14 Claims, No Drawings

LOW DENSITY ETHYLENE-BASED POLYMER COMPOSITIONS WITH GOOD MELT STRENGTH AND HIGH DENSITY

REFERENCE TO RELATED APPLICATIONS

This application claims the benefit of U.S. Provisional Application No. 61/818,234, filed on May 1, 2013.

BACKGROUND

For extrusion coating LDPE resins, typically higher density LDPE is accompanied with lower melt strength. Therefore, LDPE extrusion coating resins are typically restricted to lower density LDPE. The lower polymer density is a result of the polymerization conditions required to produce a higher melt strength polymer. There is a need for LDPE resins compositions with higher densities and good melt strength (as indicated by Force at Break (Fb)) for extrusion coating processes.

Extrusion coating and other LDPE resins are described in the following references: US 2007/0225445; EP2123707A1; WO 2011/075465; WO 2005/023912; and WO 2013/078018. However, these conventional resins do not provide benefits that result from higher density resins, such as reduced water vapor transmission and improved coefficient of friction. There remains a need for LDPE resins compositions with higher densities and good melt strength for extrusion coating processes. There is also a need for such compositions that have reduced water vapor transmission and improved coefficient of friction. There is a further need for such compositions that comprise only high-pressure LDPE polymer components to achieve a good balance of adhesion and to reduce substrate-polymer delamination. These needs and others have been met by the following invention.

SUMMARY OF INVENTION

The invention provides a composition comprising a first ethylene-based polymer, formed by a high pressure, free-radical polymerization process comprising at least one autoclave reactor, and a second ethylene-based polymer, formed by a high pressure, free-radical polymerization process comprising at least one autoclave reactor, such composition comprising the following properties:

A) a melt index (I2) from 2.5 to 10 g/10 min;
B) a density from 0.920 to 0.935 g/cc; and
wherein the second polymer is present in an amount from 5 to 95 weight percent, based on the sum of the weight of the first polymer and the second polymer; and
wherein the density of the of the second polymer is greater than the density of the first polymer, and
wherein the first polymer has a melt index I2 greater than 2.5 g/10 min.

DETAILED DESCRIPTION

New ethylene-based polymer compositions have been discovered that comprise an optimum balance of density, melt strength, processing, and end-use performance, including water vapor transmission rate and coefficient of friction, in extrusion coatings.

As discussed above, the invention provides a composition comprising a first ethylene-based polymer, formed by a high pressure, free-radical polymerization process comprising at least one autoclave reactor, and a second ethylene-based polymer, formed by a high pressure, free-radical polymerization process comprising at least one autoclave reactor, such composition comprising the following properties:

A) a melt index (I2) from 2.5 to 10 g/10 min;
B) a density from 0.920 to 0.935 g/cc; and
wherein the second polymer is present in an amount from 5 to 95 weight percent, based on the sum of the weight of the first polymer and the second polymer; and
wherein the density of the of the second polymer is greater than the density of the first polymer, and
wherein the first polymer has a melt index I2 greater than 2.5 g/10 min.

An inventive composition may comprise a combination of two or more embodiments described herein.

In one embodiment, the first polymer meets the following relationship:

$$Mw(abs) > A + B(I2),$$

where A=270,000 g/mole, and B=−8,000 (g/mole)/(dg/min).

In one embodiment, the second polymer density is greater than, or equal to, 0.9245 g/cc, further greater than, or equal to, 0.925 g/cc, further greater than, or equal to, 0.926 g/cc (1 cc=1 cm$^3$).

In one embodiment, the second polymer has a density greater than 0.926 g/cc, a melt index (I2) greater than 2.6 dg/min, and Mw(abs) greater than 120,000 g/mole, further greater than 130,000 g/mole, and further greater than 140,000 g/mole.

In one embodiment, the second polymer has a density greater than 0.926 g/cc, a melt index (I2) greater than 3.0 dg/min, and Mw(abs) greater than 150,000 g/mole.

In one embodiment, the first polymer has a melt index (I2) range from 2.5 to 10 g/10 min, further from 2.7 to 10 g/10 min, further from 2.8 to 10 g/10, further from 3.0 to 10 g/10.

In one embodiment, the second polymer has a density from 0.923 to 0.932 g/cc, further from 0.924 to 0.932 g/cc, further 0.924 to 0.930 g/cc.

In one embodiment, the second polymer has a density from 0.9245 to 0.9320 g/cc, further from 0.9245 to 0.9310 g/cc, further 0.9245 to 0.9320 g/cc.

In one embodiment, the composition has a density from 0.922 to 0.935 g/cc, further from 0.924 to 0.935 g/cc (1 cc=1 cm$^3$).

In one embodiment, the composition has a density from 0.924 to 0.930 g/cc, further from 0.924 to 0.928 g/cc (1 cc=1 cm$^3$).

In one embodiment, the composition has a melt index (I2) from 2.5 to 10 g/10 min, further from 3 to 10 g/10 min.

In one embodiment, the composition has a melt index (I2) from 2.5 to 8 g/10 min, further from 3 to 7 g/10 min.

In one embodiment, second polymer is present in an amount from 8 to 92 weight percent, further from 10 to 90 weight percent, based on the sum of the weight of the first polymer and the second polymer.

In one embodiment, the first polymer and the second polymer each independently has a G' greater than 85 Pa at 170° C., further greater than 87 Pa at 170° C.

In one embodiment, the first polymer and the second polymer each independently has a G' greater than 90 Pa at 170° C., further a G' greater than 95 Pa at 170° C.

In one embodiment, the first polymer has G' greater than 110 Pa at 170° C.

In one embodiment, the second polymer has G' greater than 90 Pa, a melt index (I2) greater than 3.0 g/10 min, and density greater than 0.925 g/cc.

In one embodiment, the difference in the density of the second polymer and the density of the first polymer is greater than, or equal to, 0.006 g/cc, further greater than, or equal to, 0.008 g/cc, further greater than, or equal to, 0.010 g/cc.

In one embodiment, the ratio of the density of the second polymer to the density of the first polymer is greater than, or equal to, 1.006, further greater than, or equal to, 1.008, further greater than, or equal to, 1.010.

In one embodiment, the second ethylene-based polymer has a melt index (I2) from 2.6 to 7 g/10 min, further from 3.0 to 7 g/10 min, further from 3.5 to 6.5 g/10 min.

In one embodiment, the first ethylene-based polymer is a polyethylene homopolymer.

In one embodiment, the second ethylene-based polymer is a polyethylene homopolymer.

In one embodiment, the composition has a Force at break (Fb) value greater than, or equal to, 18 cN (at 150° C.), further greater than, or equal to, 19 cN (at 150° C.).

In one embodiment, the composition has a "neck-in" value less than, or equal to, 200 mm, further less than, or equal to, 180 mm, further less than, or equal to, 160 mm, at a set temperature=290° C., a coating weight=25 g/m² and a line speed=300 m/min.

In one embodiment, the composition has a "draw-down" value greater than, or equal to, 300 m/min, further greater than, or equal to, 320 m/min, further greater than, or equal to, 340 m/min, at a set temperature=290° C.

Draw down is defined as the maximum line speed attainable before web breakage or web defects/edge inconsistencies occur, when accelerating the line speed at a constant polymer output. The constant polymer output level is set by a coating weight of 15 g/m², running at 100 m/min line speed. Neck-in is the difference between the final width of the web and the die width at fixed line speed.

The invention also provides an article comprising at least one component formed from an inventive composition.

In one embodiment, the article is selected from coatings, films, foams, laminates, fibers, or tapes.

In one embodiment, the article is an extrusion coating. In another embodiment, the article is a film.

The invention also provides a method for forming an inventive composition, said method comprising mixing the first ethylene-based polymer and the second ethylene-based polymer.

An inventive composition may comprise a combination of two or more embodiments as described herein.

The first ethylene-based polymer may comprise a combination of two or more embodiments as described herein.

The second ethylene-based polymer may comprise a combination of two or more embodiments as described herein.

An inventive article may comprise a combination of two or more embodiments as described herein.

An inventive method may comprise a combination of two or more embodiments as described herein.

It has been discovered that the inventive composition provided excellent extrusion coatings with improved neck-in and draw down properties. Extrusion coatings, and especially monolayer (single layer) coatings onto board and paper based substrates, or laminates with a paper or board based surface, using an inventive composition, described herein, can be used in packaging, and generally in food packaging and in industrial packaging laminates. It has also been discovered that the inventive compositions offer protection to the paper and board substrates, as well to certain perishable food, since such compositions maintain the physical properties of paper by providing an improved moisture barrier. Moisture is known to affect, in general, properties of paper and board. In addition, the inventive compositions provide good heat sealability and good mechanical strength, both required to form stable paper-based laminates, which can be processed on conventional packaging equipment, without delamination or tearing.

Additives

An inventive composition may comprise one or more additives. Suitable additives include, but are not limited to, stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers; and oil extenders, including paraffinic or napthelenic oils.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, refer to an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming two or more polymers within the same reactor).

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined infra. Trace amounts of impurities may be incorporated into and/or within a polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "ethylene-based copolymer" or "ethylene copolymer" refers to a copolymer that comprises a majority amount of polymerized ethylene based on the weight of the copolymer, and only one comonomer (thus, only two monomer types).

The terms "autoclave-based products," "autoclave-based resins," or "autoclave-based polymers," as used herein, refer to polymers, or polymer products, prepared in a reactor configuration comprising at least one autoclave reactor.

The phrase "high pressure, free-radical polymerization process," as used herein, refers to a free radical initiated polymerization carried out at an elevated pressure of at least 1000 bar (100 MPa).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing, using ASTM D792, Method B.

Melt Index: Melt index, or $I_2$, or I2, (grams/10 minutes or dg/min) is measured in accordance with ASTM D 1238, Condition 190° C./2.16 kg. $I_{10}$ or I10 is measured with ASTM D 1238, Condition 190° C./10 kg.

GPC Method: Triple Detector Gel Permeation Chromatography (TDGPC) for Mw(abs):

High temperature 3Det-GPC analysis was performed on an ALLIANCE GPCV2000 instrument (Waters Corp.) set at 145° C. The flow rate for the GPC was 1 mL/min. The injection volume was 218.5 µL. The column set consisted of four Mixed-A columns (20-µm particles; 7.5×300 mm; Polymer Laboratories Ltd).

Detection was achieved by using an IR4 detector from PolymerChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector was calibrated by measuring the scattering intensity of the TCB solvent. Normalization of the photodiodes was done by injecting SRM 1483, a high density polyethylene with weight-average molecular weight (Mw) of 32,100 g/mol and polydispersity (MWD) of 1.11. HDPE SRM 1483 was obtained from the U.S. National Institute of Standards and Technology (Gaithersburg, Md., USA). A specific refractive index increment (dn/dc) of −0.104 mL/mg, for polyethylene in TCB, was used.

The conventional GPC calibration was done with 20 narrow PS standards (Polymer Laboratories Ltd.) with molecular weights in the range from 580 to 7,500,000 g/mol. The polystyrene standard peak molecular weights were converted to polyethylene molecular weights using the following equation:

$$M_{polyethylene} = A \times (M_{polystyrene})^B,$$

with A=0.39, B=1. The value of A was determined by using a linear high density polyethylene homopolymer (HDPE) with Mw of 115,000 g/mol. The HDPE reference material was also used to calibrate the IR detector and viscometer by assuming 100% mass recovery and an intrinsic viscosity of 1.873 dL/g.

Distilled "Baker Analyzed" grade 1,2,4-trichlorobenzene (J. T. Baker, Deventer, The Netherlands), containing 200 ppm of 2,6-di-tert-butyl-4-methylphenol (Merck, Hohenbrunn, Germany), was used as the solvent for sample preparation, as well as for the 3Det-GPC experiment.

LDPE solutions were prepared by dissolving the samples under gentle stirring for three hours at 160° C. The PS standards were dissolved under the same conditions for 30 minutes. The sample concentration for the 3Det-GPC experiment was 1.5 mg/mL, and the polystyrene concentrations were 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as follows:

$$\sqrt{\frac{K_c}{R_\theta}} = \sqrt{\frac{1}{M} + \frac{16\pi^2}{3\lambda^2}\frac{1}{M}R_g^2 \sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from the initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software was used to collect the signals from the IR detector, the viscometer, and the MALS detector, and to run the calculations.

The calculated molecular weights, e.g. Mw(abs), and molecular weight distributions (e.g., Mw(abs)/Mn(abs)) were obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards, such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M}, \text{ and}$$

$$w = \int_{6}^{\infty} \frac{dw}{d\log M} d\log M.$$

Rheological G'

The sample used in the G' measurement was prepared from a compression molded plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A "25 mm" disk was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. For Software A, an Orchestrator software, was used to select the data in the region where G" was between 200 and 800 Pa (or using at least 4 data points). The data were fit to a log polynomial model using the fit equation $Y=C1+C2 \ln(x)$. Using the Orchestrator software, G', at G" equal to 500 Pa, was determined by interpolation.

For software B, data was interpolated using the Akima spline interpolation algorithm with the 3rd order piecewise polynomial fits. This is described in detail in Hiroshi Akima. "A new method of interpolation and smooth curve fitting based on local procedures", J. ACM, 17(4), 589-602 (1970).

Force at Break (Fb) and Velocity at Break (Vb)

Melt strength measurements were performed with the Gottfert Rheotens 71.97 in combination with the Gottfert ALR-MBR 71.92 extruder. After start up of the equipment and after obtaining the set temperature of 150° C., the pre-cleaned hopper was filled with the resin to be measured. The system was purged for 30 minutes at the required output, before rheotens measurements were performed. After an equilibration time of 30 minutes, the rheotens was zeroed, and a force calibration with a 2N weight was performed. Next, the polymer strand was guided through the upper wheels, and wheel velocity was reduced, or increased, in order to obtain zero force level, when the strand was touching the floor. The experiment was then started with increasing velocity, until failure was observed. The F(b) and V(b) are the average of at least five rheotens measurements, and represent the force and velocity value just prior to breakage.

The Barrel and Gear pump temperatures were 150° C. for all zones. The die "L/D" was 30 mm/2.5 mm. The die entry angle was 30°. The extruder was operated at 31.5 rpm and 610 gr/hr output. The Rheotens wheels were flat with a gap of 0.4 mm. The spinline length was 100 mm, and the acceleration was 24 mm/s^2.

Experimental

A. Ethylene-Based Polymers

LDPE PG 7008 (autoclave-based resin) with a density of 0.918 g/cc and a melt index (I2) of 7.3 g/10 min; available from the Dow Chemical Company. This resin has an Mw(abs) of 239,000 g/mole (Mw(abs)>A+B(I2)=211,600 g/mole; where A=270,000 g/mole, and B=−8,000 (g/mole)/(dg/min).

LDPE XZ89139.00 (autoclave-based resin) with a density of 0.928 g/cc and a melt index (I2) of 4-5 g/10 min; available from the Dow Chemical Company. This resin has an Mw(abs) of 177,000 g/mole (for a description of this resin see 13$^{th}$ TAPPI European PLACE Conference-30 May to 1 Jun. 2011 at Bregenz, Austria "*PE Extrusion Coating Resin Design Tools,*" by C. Zuercher et al.; pp. 1-22).

LDPE PG 7004 (autoclave-based resin) with a density of 0.922 g/cc and a melt index (I2) of about 4 g/10 min; available from the Dow Chemical Company. This resin has an Mw(abs) of 259,000 g/mole (Mw(abs)>A+B(I2)=238,800 g/mole; where A=270,000 g/mole, and B=−8,000 (g/mole)/(dg/min).

LDPE 421E (autoclave-based resin) with a density of 0.929 g/cc and a melt index (I2) of about 3 g/10 min; available from the Dow Chemical Company. This resin has an Mw(abs) of 121,000 g/mole B. Representative Preparation of Inventive Compositions (Examples 1-6)

The blend components were compounded for the rheological testing by feeding them in pellet form to an APV Baker MP19-40 TC, co-rotating, twin-screw extruder (Machine No. NEF200008 701/1), screw diameter 19 mm, L/D 2.1; with screw configuration: 12 D feed screw/4×0.25 D paddle 30° F. (block)/5×0.25 D paddle 60° F./5×0.25 D paddle 90°/4 D feed screw/3 D neutral element/4 D feed screw/5×0.25 D paddle 30° F./2.5 D feed screw/5×0.25 D paddle 60° F./7 D feed screw/1.5 D discharge feed screw. Compounding was performed under mild conditions, in order to prevent change of molecular structure. The Barrel Temperature of zone 1 was 160° C. The Barrel Temperature of each of zone 2 to zone 7 was 170° C. The Die Temperature was 170° C. The measured melt temperature was 176° C. The operating rate was 200 RPM, and the output was 2.9 kg/hr. The operation was performed under a nitrogen purge. The compounds were pelletized upon exiting the extruder. The pure components were APV extruded and pelletized using same conditions.

The other (non-rheological) properties were determined on the coatings and films prepared from an extrusion step, as explained in the section on coating formation and film formation.

Properties of the inventive compositions (Examples 1-6) and comparative compositions (Examples A-D) are shown in Table 1 and 2.

TABLE 1

Properties of Compositions (each percent in wt %)

| Example | Polymers | I2 (dg/min) | Density (g/cc) | G' (Pa) (170° C.) | Fb (N) (150° C.) | Vb (mm/s) (150° C.) |
|---|---|---|---|---|---|---|
| A | 100% PG7008 | 7.3 | 0.918 | 120 | 0.194 | 932 |
| 1 | 75% PG7008-25% XZ8913.00 | 6.2 | 0.921* | 115 | 0.197 | 937 |
| 2 | 50% PG7008 50% XZ89139.00 | 5.4 | 0.923* | 110 | 0.197 | 870 |
| 3 | 25% PG7008 75% XZ89139.00 | 4.7 | 0.926* | 104 | 0.198 | 868 |
| B | 100% XZ89139.00 | 4.04 | 0.928 | 98 | 0.194 | 862 |

*Calculated densities based on the blend rule: 1/density = w1/density1 + w2/density2; where wi (i = 1 or 2) is the weight fraction of each component.

TABLE 2

Properties of Compositions (each percent in wt %)

| Example | Polymers | I2 (dg/min) | Density (g/cc) | G' (Pa) (170° C.) | Fb (N) (150° C.) | Vb (mm/s) (150° C.) |
|---|---|---|---|---|---|---|
| C | 100% PG7004 | 3.9 | 0.922 | 131 | 0.219 | 802 |
| 1 | 75% PG7004-25% 421E | 3.6 | 0.9234* | 120 | 0.214 | 817 |
| 2 | 50% PG7004 50% 421E | 3.4 | 0.9259* | 109 | 0.210 | 828 |
| 3 | 25% PG7004 75% 421E | 3.1 | 0.9276* | 100 | 0.203 | 834 |
| D | 100% 421E | 2.8 | 0.929 | 90 | 0.194 | 881 |

*Calculated densities based on the blend rule: 1/density = w1/density1 + w2/density2; where wi (i = 1 or 2) is the weight fraction of each component.

C. Extrusion Coatings and Monolayer Films

Coatings

Monolayer extrusion coatings were performed at following temperature settings: Extruder Barrel—200/250/280/320/320/320° C.; Flange/Adapter/Piping—320° C. (6 zones); and Die—320° C.×10 Zones.

Monolayer flat film extrusion was performed at temperature settings: Extruder Barrel—200/250/280/290/290/290° C.; Flange/Adapter/Piping—290° C. (6 zones); and Die—290° C.×10 Zones. Films were processed according to the below described extrusion coating set-up, without feeding a paper substrate. Flat films at a weight of 25 g/m2 were obtained at a laminator speed of 100 m/min.

The experimental compositions (see Table 1) were extruded on a "3.5 inch" diameter screw, with a length over diameter (L/D) ratio of 32, onto 70 g/m² Kraft paper (coatings only), in an amount (coating weight) of 25 g/m². Melt pressure and melt temperature were recorded with thermocouples placed in the adapter. The melt was delivered through a Davis Standard/Er-We-Pa flex lip edge bead reduction die, Series 510A, nominally set to a die gap of 0.6 mm. The melt drawing and application of the melt vertically onto the moving substrate was performed at an air gap of 250 mm and a nip off-set of 15 mm, towards the pressure roll. The melt was applied onto the moving substrate in the laminator nip, which is the contact point of the pressure roll, with a rubber surface layer contacting the "water cooled" chill roll with a matte surface finish, and maintained at a temperature of 15° C. to 20° C. The air gap was defined as the vertical distance between the die lip and the laminator nip. The nip off-set was defined as the horizontal off-set of the die lip position relative to the laminator nip. Prior to extrusion, dry blends were prepared using a Maguire WSB-240T gravimetric blending unit (at room temperature), permitting controlled weight percentages of respective blend components.

Various fixed line speeds (100 m/min and 300 m/min) were used to determine the neck-in, at coating weights of 15 g/m² and 25 g/m². Draw down is defined as the maximum line speed attainable before web breakage or web defects/edge inconsistencies occur, when accelerating the line speed at a constant polymer output. The constant polymer output level is set by a coating weight of 15 g/m² running at 100 m/min line speed. Neck-in is the difference between the final width of the web and the die width at fixed line speed. Lower neck-in and higher draw down are both very desirable. Lower neck-in indicates better dimensional stability of the web, which, in turn, provides for better control of the coating onto the substrate. Higher draw down indicates higher line speed capability, which, in turn, provides for better productivity. Extrusion coating processing properties are shown in Table 3. Film processing properties are shown in Table 4.

TABLE 3

Extrusion Coating Processing Characteristics of Compositions

| Ex | Polymers | Neck-in; 25 g/m² at 320° C.; 100 m/min (mm) | Neck-in; 25 g/m²; at 320° C.; 300 m/min (mm) | Neck-in; 15 g/m2 at 320° C.; 100 m/min (mm) | Draw-down 320° C. (m/min)* |
|---|---|---|---|---|---|
| A | 100% PG 7008 | 111 | 96 | 84 | 344 |
| 1 | PG 7008-XZ89139.00 (75:25) | 129 | 107 | 101 | 342 |
| 2 | PG 7008-XZ89139.00 (50:50) | 150 | 121 | 118 | 351 |
| 3 | PG 7008-XZ89139.00 (25:75) | 204 | 152 | 160 | 500 |
| B | 100% XZ 89139.00 | 304 | 304 | 252 | 600 |

*Starting at a coating weight of 15 g/m².

TABLE 4

Film (Monolayer) Processing Characteristics of Compositions

| Ex. | Polymers | Neck-in 25 g/m² at 290° C.; 100 m/min (mm) |
|---|---|---|
| A | PG 7008 | 88 |
| 1 | PG 7008-XZ89139.00 (75:25) | 105 |
| 2 | PG 7008-XZ89139.00 (50:50) | 121 |
| 3 | PG 7008-XZ89139.00 (25:75) | 145 |
| B | XZ 89139.00 | 195 |

*Acceleration from a coating weight of 15 g/m².

Final coating properties are shown in Table 5, and final film properties are shown in Table 6.

Water Vapor Transmission of 25 g/m2 coated paper was measured in accordance to ASTM E-398, under the test conditions of T=38° C., 90% relative humidity, with the substrate side facing the vapor.

The dynamic Coefficient of Friction (COF) was measured in accordance to ISO 8295. The Friction was measured for the coating against coating.

The differential scanning calorimetry (DSC) method, in accordance to ISO 11357-1 Ed. 2009, was applied on film samples. Following the prescribed sample conditioning the crystallization peaks Tc1 and Tc2 in deg C. were established during the cooling cycle, and the melting peaks Tm in deg C. and % Crystalline fraction were established on the basis of the 2nd heating cycle. The detailed measurement cycle follows the following procedure:

Sample conditioning at −30 deg C. for 5 minutes;

1st heating cycle from −30 deg C. to 170 deg C. at a heating rate of 10 deg C./min;

Sample kept at 170 deg C. for 5 minutes;

Cooling cycle from 170 deg C. down to −30 deg C. at cooling rate of 10 deg C./min;

2nd heating cycle from −30 deg C. to 170 deg C. at a heating rate of 10 deg C./min.

TABLE 5

Properties of "25 g/m2 Coatings" on Kraft Paper

| Ex. | Polymers | WVTR (Coating) (g/m²/day) | Dynamic CoF (Coating) (—) | Static CoF (Coating) |
|---|---|---|---|---|
| A | PG 7008 | 24.3 | 0.312 | 0.287 |
| 1 | PG 7008-XZ89139.00 (75:25) | 22.7 | 0.311 | 0.289 |
| 2 | PG 7008-XZ89139.00 (50:50) | 20.9 | 0.247 | 0.242 |
| 3 | PG 7008-XZ89139.00 (25:75) | 16.8 | 0.242 | 0.234 |
| B | XZ 89139.00 | 15.3 | 0.213 | 0.219 |

TABLE 6

Properties of Flat Films

| Ex. | Polymers | DSC Tm (deg C.) | DSC Tc1 (deg C.) | DSC Tc2 (deg C.) | Percentage Crystalline Fraction (Film) (%) |
|---|---|---|---|---|---|
| A | PG 7008 | 106.8 | 94.8 | 57.5 | 42.8 |
| 1 | PG 7008-XZ89139.00 (75:25) | 110.9 | 98.2 | 59.6 | 47.6 |
| 2 | PG 7008-XZ89139.00 (50:50) | 113.2 | 101.3 | 62.2 | 49.4 |
| 3 | PG 7008-XZ89139.00 (25:75) | 114.3 | 102.7 | 64.2 | 51.4 |
| B | XZ 89139.00 | 114.9 | 104.1 | 66.3 | 53.6 |

The inventive compositions had very good drawn-down and neck-in values. In regard to LDPE XZ89139.00, neck-in was substantially improved by blending with LDPE PG7008, for example, at a 25/75 weight ratio. Draw-down of the composition can also be adjusted by varying the blend ratio. As seen in the inventive compositions, the WVTR and CoF values decreased when blending LDPE XZ89139 into LDPE PG7008, representing an improvement in these properties. The inventive compositions have sufficiently high densities that result in good WVTR and CoF properties. The blend ratio of the components of the inventive compositions can be used to adjust the balance between the processability and the end-use properties, and offer unique combinations of properties not achievable by the individual resin components.

The invention claimed is:

1. A composition comprising a first ethylene-based polymer, formed by a high pressure, free-radical polymerization process comprising at least one autoclave reactor, and a second ethylene-based polymer, formed by a high pressure, free-radical polymerization process comprising at least one autoclave reactor, such composition comprising the following properties:
A) a melt index (I2) from 2.5 to 10 g/10 min;
B) a density from 0.920 to 0.935 g/cc; and
wherein the second polymer is present in an amount from 5 to 95 weight percent, based on the sum of the weight of the first polymer and the second polymer; and
wherein the density of the of the second polymer is greater than the density of the first polymer, and
wherein the first polymer has a melt index I2 greater than 2.5 g/10 min; and
wherein the second polymer has a density greater than 0.926 g/cc, a melt index I2 greater than 2.6 dg/min, and a Mw(abs) greater than 120,000 g/mole.

2. The composition of claim 1, wherein the first polymer has a Mw(abs) and an I2, which meet the following relationship:

$$Mw(abs) > A + B(I2),$$

where A=270,000 g/mole, and B=−8,000 (g/mole)/(dg/min).

3. The composition of claim 1, wherein the second polymer is resent in an amount from 8 to 92 weight percent based on the sum weight of the first polymer and the second polymer.

4. The composition of claim 1, wherein the second polymer is resent in an amount from 10 to 90 weight percent based on the sum weight of the first polymer and the second polymer.

5. The composition of claim 1, wherein the first polymer has a melt index (I2) from 2.5 to 10 g/10 min.

6. The composition of claim 1, wherein the second ethylene-based polymer has a melt index (I2) from 3.0 to 7 g/10 min.

7. The composition of claim 1, wherein the first polymer and the second polymer each, independently, has a G' greater than 85 Pa at 170° C.

8. The composition of claim 1, wherein the difference in the density of the second polymer and the density of the first polymer is greater than, or equal to, 0.006 g/cc.

9. The composition of claim 1, wherein the ratio of the density of the second polymer to the density of the first polymer is greater than, or equal to, 1.006.

10. The composition of claim 1, wherein the first ethylene-based polymer is a polyethylene homopolymer.

11. The composition of claim 1, wherein the second ethylene-based polymer is a polyethylene homopolymer.

12. An article comprising at least one component formed from the composition of claim 1.

13. The article of claim 12, wherein the article is a coating, a film, a foam, a laminate, a fiber, or a tape.

14. A method for forming the composition of claim 1, said method comprising mixing the first polymer and the second polymer.

* * * * *